United States Patent [19]

Kulka

[11] 3,764,712

[45] Oct. 9, 1973

[54] COMPOSITIONS CONTAINING HEXOXYACETALDEHYDES AND THEIR DERIVATIVES

[75] Inventor: Kurt Kulka, New York, N.Y.

[73] Assignee: Fritzsche Dodge & Olcott Inc., New York, N.Y.

[22] Filed: Nov. 24, 1970

[21] Appl. No.: 92,512

Related U.S. Application Data

[63] Continuation-in-part of Ser. No. 637,941, May 12, 1967, abandoned.

[52] U.S. Cl. ............... 426/222, 252/522, 260/601
[51] Int. Cl. ....... A23l 1/26, C07c 47/06, C11b 9/00
[58] Field of Search ................. 99/140 R; 260/601, 260/602; 252/522

[56] References Cited
UNITED STATES PATENTS

| | | | |
|---|---|---|---|
| 2,196,744 | 4/1940 | Dickey | 262/8.9 |
| 2,409,015 | 10/1946 | Bordenca | 260/615 |
| 2,902,515 | 9/1959 | Montavon | 252/522 X |
| 3,654,309 | 4/1972 | Thomas | 252/522 X |

OTHER PUBLICATIONS

M. Rotbart, Annales De Chemie, Ser. 11, Vol. 1, 457–468, 507–512, 1934.

K. Kulka et al., American Perfumer and Cosmetics, 82, 29–30 (June 1967).

*Primary Examiner*—Morris O. Wolk
*Assistant Examiner*—Sidney Marantz
*Attorney*—Frank M. Nolan

[57] ABSTRACT

Compositions containing hexoxyacetaldehydes and/or their derivatives for flavoring foodstuffs or for use in perfumery.

20 Claims, No Drawings

COMPOSITIONS CONTAINING HEXOXYACETALDEHYDES AND THEIR DERIVATIVES

This application is a continuation-in-part of the copending patent application Ser. No. 637,941, filed May 12, 1967, now abandoned.

This invention relates to compositions including certain aliphatic oxyacetaldehydes and certain of their derivatives.

While many aliphatic oxyacetaldehydes are known, the compositions of this invention contain novel compounds which possess unique olfactory and taste characteristics which render the compositions of this invention particularly useful in perfumery and in the flavoring of food-stuffs. The compositions of this invention are especially useful in soaps and cosmetics. They are also effective in the flavoring of food-stuffs such as vegetable juices and spicing preparations.

In accordance with one aspect of this invention, compositions are provided which contain at least one-fourth percent by weight of the novel compounds — hexoxy-acetaldehydes and/or their derivatives — and at least 1 percent by weight of a component which modifies the olfactory or taste properties of the hexoxyacetaldehydes or their derivatives. Other components such as one or a plurality of other perfume or flavoring materials may be included in the composition.

In accordance with another aspect of this invention, the novel compounds employed in the composition may be utilized per se without the component of the composition which modifies the olfactory or taste properties of those compounds.

The novel compounds of this invention are hexoxyacetaldehydes, dialkyl acetals of such aldehydes, cyclic acetals of such aldehydes, hemi-acetals of such aldehydes and polymeric forms of such aldehydes, such as aldols. The hexoxyacetaldehydes have the formula:

$$R-O-CH_2CHO$$

in which R is a monovalent hydrocarbon radical having six carbon atoms. The monovalent hydrocarbon radical may be a saturated straight or branched chain radical, such as n-hexyl or 2-methyl-n-pentyl or an unsaturated hydrocarbon radical containing one or two double bonds, such as $CH_3CH_2CH_2CH=CHCH_2-$, $(CH_3)_2C=CHCH_2CH_2-$ or $(CH_3)_2 C=CHCH=CH-$, a straight or branched chain hydrocarbon radical containing a triple bond, such as $CH \equiv CCH_2CH_2CH_2CH_2-$ and $(CH_3)_2CHC \equiv CCH_2-$. The alkyl groups in the dialkyl acetals or hemi-acetals of this invention are lower alkyl containing not more than five carbon atoms and preferably not more than two carbon atoms. Desirably the acetals do not have more than sixteen carbon atoms.

The hexoxyacetaldehydes of this invention may be produced by reacting an alkali metal alcoholate of the required alcohol with a chloro acetaldehyde-dialkylacetal. The required alkali metal alcoholate, such as sodium alcoholate, may be produced by reacting the required alcohol with an alkali metal hydride, such as sodium hydride, desirably in the form of an oil emulsion of the hydride in a nitrogen atmosphere. The reaction which takes place when chloro acetaldehyde-dimethylacetal and the required sodium alcoholate are employed is as follows:

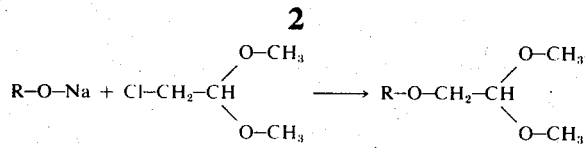

In the initial step for the production of the required alcoholate, sodium hydride may be added, for example, in the form of a 54 percent oil emulsion, under agitation, and cooling with an ice-water bath. This is an exothermic reaction and the temperature is desirably maintained within the range of 17°–30° C. After completion of the addition, the cooling bath is removed and the mixture desirably agitated in a nitrogen atmosphere for about 4½ hours. Additional quantities of the required alcohol may be added in order to facilitate agitation and the mixture heated to the boiling point of the required alcohol to drive the reaction to completion. The substantial conversion to the alcoholate is indicated in this instance by the termination of hydrogen evolution. The chloroacetaldehyde-dialkylacetal is then added. The reaction mixture is refluxed with agitation for several hours until I.R. determination indicates the substantial disappearance of chlorine. Warm water is then added and the solids are dissolved. Two layers are formed which are separated and the organic part is filtered to separate it from some muck which is usually formed. The aqueous portion is extracted with a suitable organic solvent such as benzene and the extract is added to the organic layer. The combined organic portions are washed successively with warm water, saturated sodium bicarbonate solution and finally with water. The organic solvent, such as benzene, is then distilled off from the organic layer, and the remaining reaction product fractionated through a 1½ foot Vigreaux column. The main portion boils at about 88°–90° C. at 7 mm.

The dialkylacetal of any hexoxyacetaldehyde may be utilized to produce the corresponding hexoxyacetaldehyde. The dimethylacetal of any such hexoxyacetaldehyde is of value for use as an odoriferous component in many compositions to scent them, including soap and cosmetics. For example, the dimethylacetal of n-hexanoxyacetaldehyde has a pronounced green odor of rare naturalness which is one of the most desirable odor notes in perfumery. The corresponding diethylacetal has a similar odor but of lesser intensity.

The desired 2-hexanoxyacetaldehyde is produced by hydrolysis from 2-hexanoxyacetaldehyde-dimethylacetal. The 2-hexanoxyacetaldehyde-dimethylacetal is hydrolyzed with a 2 percent aqueous sulfuric acid solution under reflux for one hour. It is cooled and separates into an organic and an aqueous layer. The aqueous layer is desirably extracted with an organic solvent, such as benzene. The organic layer and extracts are combined and washed with water. The solvent is distilled off. The remaining crude aldehyde is purified by fractional distillation through a one inch Vigreaux column. The main faction boils at about 80°–88° C. at 7mm.

The methylene group of hexoxyacetaldehydes is activated because it is flanked by an ether and an aldehyde group. Such aldehydes are relatively unstable. On standing at room temperature in a closed brown bottle, they undergo self-condensation and indications are that an aldol is formed. In the case of n-hexanoxyacetaldehyde, the structure of the aldol would appear to be as follows:

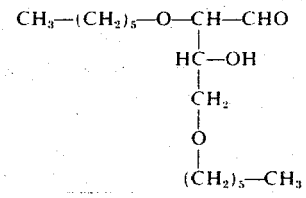

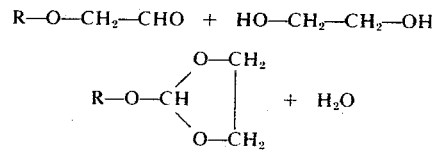

This dimerization, for example that of n-hexanoxyacetaldehyde, proceeds rather rapidly as observed by the change of the I.R. curve of the product after standing overnight. Thereafter the pace of this process slows down markedly, and it takes approximately 9 months standing at room temperature until the intensity of the carbonyl peak of the I.R. curve becomes constant, and simultaneously wet analysis shows the correct carbonyl value for the dimer. The refractive index at 20° C. of the aldehyde is: 1.4230 and that of the aldol is 1.4326.

The absence of any turbidity indicates that the aldol did not dehydrate to the unsaturated compound and the I.R. pattern of this product is in conformity with this finding. The odor of the liquid, assumed to be the (dimeric) aldol is strongly reminiscent of the original aldehyde, but less intense and somewhat less clean.

To produce the di lower alkylacetals of any of the hexoxyacetaldehydes, the required corresponding chloroacetaldehyde di lower alkylacetal is employed instead of chloroacetaldehyde dimethylacetal. For example, if the diethylacetal of n-hexanoxyacetaldehyde is desired, chloroacetaldehyde diethylacetal is reacted with the sodium alcoholate of n-hexanol.

Freshly distilled hexoxyacetaldehydes may be stabilized as their hemi-acetals by combining the aldehyde with a lower alkyl alcohol, such as ethyl alcohol or a dihydroxy alcohol such as propylene glycol or dipropylene glycol or a combination of monohydroxy and dihydroxy alcohols. Desirably, equal quantities of the aldehyde and alcohol or mixtures of alcohols are employed. Such a 50:50 percent solution preserves the original odor characteristics as was established by organoleptic evaluations at intervals ranging from 1 to 9 months.

A cyclic acetal may be produced by adding one molecular equivalent of a freshly distilled hexoxyacetaldehyde to about ten molecular equivalents of a glycol, such as ethylene glycol. The solution usually warms up indicating the formation of the hemiacetal. After the exothermic reaction terminates (the temperature is approximately 45°–50° C.) the solution is permitted to stand for several hours at room temperature, desirably overnight. After standing, a catalytic amount of a mineral acid, such as phosphoric acid is added to promote the formation of the cyclic acetal. The solution is warmed, maintained at 40°–45° C. for several hours and is then made alkaline with sodium hydroxide or sodium carbonate solution. The excess glycol is distilled under vacuum and the remaining cyclic acetal may be purified by fractional distillation in a vacuum. The reaction which takes place is indicated as follows:

DESCRIPTION OF PREFERRED EMBODIMENTS

EXAMPLE I

2-HEXOXYACETALDEHYDE-DIMETHYLACETAL

The reaction was conducted in a nitrogen atmosphere by leading a stream of nitrogen below the surface of the reaction mixture. There were placed in a two liter 3-necked reaction flask 255 g. of n-hexanol. 53.3 G. of sodium hydride as a 54 percent oil emulsion were added to the n-hexanol contained in the reaction flask under agitation and cooling with an ice-water bath over a period of 20 minutes. The reaction was exothermic and the temperature range was maintained at 17°–30° C. After the addition, the cooling bath was removed. Agitation was continued with nitrogen ebullition over a period of about 4½ hours. At that time, the hydrogen test was negative. The mixture was permitted to stand overnight with agitation. The reaction product was a creamy, slightly yellow suspension. 100 G. of n-hexanol were added to facilitate agitation and the mixture became clear and thin. The mixture was then heated to 117° C. There were added over a period of about 4½ hours below the surface with agitation and nitrogen ebullition 124.5 g. of chlorodimethyl-acetal. The temperature of the reaction mixture was maintained at 120°–135° C. The mixture refluxed with agitation for 1 hour. It was permitted to stand over a weekend and then refluxed for an additional 7 hours. The progress of the reaction was followed by infrared (I.R.) determination and the reaction was terminated upon the substantial disappearance of the I.R. peak indicative of chlorine. To the cooled reaction mixture was added 1,000 ml. of warm water. The solids dissolved and two layers were formed. The layers were separated and the organic part was filtered to liberate it from some muck. The aqueous portion was extracted twice with 200 ml. of benzene. The benzene extracts were added to the main organic part. The resulting solution was washed successively with 500 ml. of warm water, 500 ml. of saturated aqueous sodium bicarbonate solution and twice with 500 ml. of water. The benzene was distilled off in vacuum. The residue was fractionated through a 1½ foot Vigreaux column. The results of the fractionation is shown in the following table:

| Fraction | Temperature of vapor (° C.) | Temperature of flask (° C.) | Vacuum in mm. | Volume in ml. | Weight in grams | |
|---|---|---|---|---|---|---|
| 1 | 38–66 | 82–83 | 33 | 2 | 1.8 | |
| 2 | 66–83 | 83–128 | 31 | 280 | 230.6 | Recovered n-hexanol |
| 3 | 72–88 | 101 | 7 | 7 | 6.6 | Intermediate |
| 4 | 88–90 | 101–153 | 7 | 100 | 89.7 | Main |
| 5 | 76 | 166 | 7 | 4 | 3.4 | High fraction |
| | | | | Residue | 71.8 | |

The main fraction had a refractive index (R.I.) at 20° C. of 1.4170. The I.R. confirmed the presence of 2- hexoxyacetaldehydedimethylacetal. The wet analysis indicated an approximate 100 percent purity.

EXAMPLE II

2-HEXENOXYACETALDEHYDE DIMETHYLACETAL

The same procedure is followed as in Example I except that about 255 g. of 2-hexen-1-ol is employed instead of the 255 g. of n-hexanol.

The boiling point of the resulting 2-hexenoxyacetaldehyde dimethylacetal is 110°–111° C. at 15 mm. The refractive index at 20° C. is 1.4331.

EXAMPLE III

1,3-DIMETHYLBUTANOXYACETALDEHYDE DIMETHYLACETAL

The procedure described in Example I is followed except that 255 g. of 1,3-dimethylbutanol is employed instead of the 255 g. of n-hexanol.

The boiling point of the resulting 1,3-dimethylbutanoxyacetaldehyde dimethylacetal is 86°–89° C. at 15 mm. The refractive index at 20° C. is 1.4139.

EXAMPLE IV

2-METHYLPENTANOXYACETALDEHYDE DIMETHYLACETAL

The procedure described in Example I is followed except that 255 g. of 2-methylpentanol is employed instead of 255 g. of n-hexanol.

The boiling point of the resulting 2-methylpentanoxyacetaldehyde dimethylacetal is 103°–105° C. at 20 mm. The refractive index at 20° C. is 1.4161.

EXAMPLE V

2-ETHYLBUTANOXYACETALDEHYDE DIMETHYLACETAL

The procedure described in Example I is followed except that 255 g. of 2-ethylbutanol is employed instead of 255 g. of n-hexanol.

The boiling point of the resulting 2-ethylbutanoxyacetaldehyde dimethylacetal is 93°–94° C. at 20 mm. The refractive index at 20° C. is 1.4168.

EXAMPLE VI

2-HEXANOXYACETALDEHYDE DIETHYLACETAL

The procedure described in Example I is followed except that 152 g. of chloroacetaldehyde diethylacetal is employed instead of 124.5 g. of chloroacetaldehyde dimethylacetal.

The boiling point of the resulting n-hexanoxyacetaldehyde diethylacetal is 106°–108° C. at 7 mm. The refractive index at 20° C. is 1.4188.

EXAMPLE VII

2-HEXOXYACETALDEHYDE-DIPROPYLENEGLYCOL HEMI-ACETAL

In order to prepare the dipropylene glycol hemiacetal, the 2-hexoxyacetaldehyde-dimethylacetal prepared as described in Example I is reacted with a 2 percent aqueous sulfuric acid solution under reflux and agitated for 1 hour. This procedure liberates the free aldehyde. It is necessary to neutralize the sulfuric acid and to work up the reaction product without delay. This is accomplished by combining the free aldehyde with dipropylene glycol as a 50:50 percent mixture. On standing the hexoxyacetaldehyde-propyleneglycol hemiacetal is formed.

The 2-hexoxyacetaldehyde-dimethylacetal employed in Examples VIII through XVI is prepared in accordance with the method described in Example I, while the 2-hexoxyacetaldehyde-dipropyleneglycol hemiacetal employed in Example XV is prepared by the method described in Example VII.

EXAMPLE VIII

HYACINTH PERFUME COMPOSITION

A hyacinth perfume composition is prepared by mixing the following:

| PARTS by weight | COMPONENTS |
| --- | --- |
| 15 | Phenyl acetaldehyde 10% |
| 5 | Oil tolu. balsam extra |
| 15 | Phenylethyl alcohol coeur |
| 20 | Cinnamic alcohol |
| 8 | Hydroxy citronellal extra |
| 5 | Heliotropin |
| 3 | Terpineol pure |
| 4 | Oil petitgrain paraguay |
| 1 | Benzyl acetate |
| 2 | Phenylethyl acetate |
| 2 | α-Ionone white coeur |
| 5 | Isoeugenol 10% |
| 3 | Oil ylang extra |
| 5 | Linalool synth. |
| 2 | Dimethyl benzyl carbinyl acetate |
| 1 | Oil galbanum |
| 45 | 2-Hexoxyacetaldehyde dimethylacetal |
| 9 | Diethyl phthalate |
| 150 | |

EXAMPLE IX

MUGUET PERFUME COMPOSITION

A muguet perfume composition is prepared by mixing the following:

| PARTS by weight | COMPONENTS |
| --- | --- |
| 20 | Hydroxy citronellal extra |
| 14 | Rhodinol pure |
| 14 | Nerol coeur |
| 10 | Linalool ex bois de rose |
| 4 | Hydroxy citronellal dimethyl acetal |
| 4 | Anisyl alcohol |
| 5 | Cinnamic alcohol |
| 4 | Phenylethyl alcohol coeur |
| 2 | Oil ylang extra |
| 2 | Amyl cinnamic aldehyde |
| 2 | Benzyl acetate |
| 1 | Jasmophore |
| 1 | Oil petitgrain terpeneless |
| 5 | Methyl phenyl acetaldehyde 10% |
| 1 | Citral |
| 2 | Linalyl acetate ex bois rose |
| 5 | Absolute rose de mai exotique 10% |
| 3 | Hyperabsolute civet 1% |
| 11 | 2-hexoxyacetaldehyle-dimethylacetal |
| 110 | |

EXAMPLE X

ROSE PERFUME COMPOSITION

A rose perfume composition is prepared by mixing the following:

| PARTS by weight | COMPONENTS |
| --- | --- |
| 15 | Phenylethyl alcohol coeur |
| 10 | Rhodinol pure |
| 10 | Oil geranium reunion extra |
| 15 | Ionone α white coeur |
| 1 | Agrumen aldehyde |
| 0.5 | Eugenol USP extra |
| 5 | Nerol coeur |

| | |
|---|---|
| 10 | Geranyl acetate |
| 33 .5 | Citronellol |
| 1900 | 2-Hexoxyacelaldehyde dimethyl acetal |
| 2000 | |

EXAMPLE XI

FOIN COUPE

A foin coupe perfume composition is prepared by mixing the following:

| PARTS by weight | COMPONENTS |
|---|---|
| 10 | Coumarin |
| 1 | Hyperabsolute tonka feve 10% |
| 20 | Linalool synth. |
| 5 | Benzyl acetate |
| 3 | Geranium reunion extra |
| 5 | Benzodihydropyran purified |
| 5 | Methyl acetophenone |
| 4 | Oil bergamot extra |
| 12 | Oil lavender barreme |
| 2 | Lavender absolute barreme |
| 2 | Hydroxy citronellal extra |
| 2 | Jasmin absolute Italian |
| 2 | Rose de mai exotique |
| 2 | Sage sclaree extra |
| 1 | Oil ylang extra |
| 1 | Anisyl alcohol |
| 3 | Diethyl phthalate |
| 240 | 2-hexoxyacetaldehyde dimethyl acetal |
| 320 | |

EXAMPLE XII

CARNATION

A carnation perfume composition is prepared by mixing the following:

| PARTS by weight | COMPONENTS |
|---|---|
| 35 | Isoeugenol |
| 10 | Benzyl isoeugenol |
| 6 | Helioptopin |
| 2 | Otto of rose imitation |
| 2 | Petitgrain terpeneless |
| 2 | Oil ylang extra |
| 1 | Phenyl acetaldehyde 10% |
| 13 | Eugenol |
| 4 | Jasmin absolute art. |
| 2 | Oil black pepper |
| 1 | Phenyl propyl aldehyde 10% |
| 1 | Aldehyde C-16 1% |
| 3 | Vanillin ex lignin |
| 2 | Hydroxy citronellal extra |
| 2 | Terpineol imp. style |
| 4 | Isobutyl phenyl acetate |
| 0 .5 | 2-hexoxyacetaldehyde dimethyl acetal |
| 9 .5 | Diethyl phthalate |
| 100 | |

EXAMPLE XIII

CYCLAMEN

A cyclamen perfume composition is prepared by mixing the following:

| PARTS by weight | COMPONENTS |
|---|---|
| 35 | Hydroxy citronellal extra |
| 5 | Heliotropin |
| 3 | Rose absolute maroco |
| 1 | Nerol coeur |
| 2 | Cyclamen aldehyde extra |
| 2 | Jasmin abs. Ital. |
| 10 | α-Ionone white coeur |
| 10 | Linalool ex bois de rose |
| 5 | Terpineol extra |
| 10 | Cinnamic alcohol |
| 2 | Tinc. amber gris 4:128 |
| 5 | Oil bergamot extra |
| 1 | Oil ylang extra |
| 91 | 2-Hexoxyacetaldehyde dimethyl acetal |
| 182 | |

EXAMPLE XIV

GREEN PEPPER FLAVORING

A green pepper flavoring is prepared by mixing the following:

| PARTS by weight | COMPONENT |
|---|---|
| 1.0 | Oleoresin paprica |
| 2.0 | Oleoresin capsicum |
| 1.0 | Oil lemon |
| 0.1 | Oil clove |
| 0.2 | Phellandrene |
| 0.1 | Oil black pepper |
| 0.1 | Oil celery |
| 5.0 | 2-Hexoxyacetaldehyde dimethyl acetal |
| 90.5 | Vegetable oil |
| 100.0 | |

The 2-hexoxyacetaldehyde dimethyl acetal imparts a natural vegetable-note to the flavor.

EXAMPLE XV

VEGETABLE JUICE SPICING COMPOSITION

A vegetable juice spicing composition is prepared by mixing the following:

| PARTS by weight | COMPONENT |
|---|---|
| 2.0 | Oleoresin capsicum |
| 2.0 | Oil clove |
| 5.0 | 2-Hexoxyacetaldehyde dimethyl acetal |
| 4.0 | Oil lemon (folded) |
| 2.0 | Oil celery |
| 1.0 | Oil black pepper |
| 25.0 | Polysorbate 80 |
| 59.0 | Triacetin |
| 100.0 | |

The 2-hexoxyacetaldehyde dimethyl acetal imparts an herb-like note to the flavor.

EXAMPLE XVI

ORANGE JUICE FLAVOR

An orange juice flavor composition is prepared by mixing the following:

| PARTS by weight | COMPONENT |
|---|---|
| 0.2 | Hexanal |
| 0.2 | Heptanal |
| 0.4 | Octanal |
| 0.6 | Nonanal |
| 0.6 | Decanal |
| 0.2 | Dodecanal |
| 0.4 | Citral |
| 10.0 | 2-Hexoxyacetaldehyde dipropyleneglycol hemi-acetal |
| 87.4 | Orange oil |
| 100.0 | |

The 2-hexoxyacetaldehyde dipropyleneglycol hemi-acetal imparts a greatly enhanced and distinct orange juice flavor.

What is claimed is:

1. A composition for flavoring foodstuffs or for use in perfumes comprising at least 1/4% by weight of a compound selected from the group consisting of hexoxyacetalde-hydes, dialkylacetals of said aldehydes, cyclic acetals of said aldehydes, hemi-acetals of said aldehydes and polymeric forms of said aldehydes, said aldehydes having the formula:

$$R-O-CH_2CHO$$

in which R is a monovalent hydrocarbon radical having six carbon atoms and at least 1 percent by weight of a component which modifies the olfactory or taste properties of said compound.

2. A composition in accordance with claim 1 in which R of the formula is a saturated straight chain monovalent hydrocarbon radical.

3. A composition in accordance with claim 1 in which R of the formula is a branched chain monovalent hydrocarbon radical.

4. A composition in accordance with claim 1 in which R of the formula is an unsaturated monovalent hydrocarbon radical containing one or two double bonds.

5. A composition in accordance with claim 1 in which R of the formula is an unsaturated monovalent hydrocarbon radical containing a triple bond.

6. A composition in accordance with claim 1 in which said compound is a hexoxyacetaldehyde.

7. A composition in accordance with claim 1 in which said compound is a polymeric form of a hexoxyacetaldehyde.

8. A composition in accordance with claim 1 in which the number of carbon atoms of said compound does not exceed 16.

9. A composition in accordance with claim 1, in which said compound is n-hexanoxyacetaldehyde.

10. A composition in accordance with claim 1, in which said compound is n-hexanoxyacetaldehyde dimethylacetal.

11. A composition in accordance with claim 1, in which said compound is 2-n-hexenoxyacetaldehyde dimethylacetal.

12. A composition in accordance with claim 1, in which said compound is 1,3-dimethyl-n-butanoxyacetaldehyde dimethylacetal.

13. A composition in accordance with claim 1, in which said compound is 2-methyl-n-pentanoxyacetaldehyde dimethylacetal.

14. A composition in accordance with claim 1, in which said compound is 2-ethyl-n-butanoxyacetaldehyde dimethylacetal.

15. A composition in accordance with claim 1, in which said compound is n-hexanoxyacetaldehyde diethylacetal.

16. A composition in accordance with claim 1, in which said compound is a cyclic acetal.

17. A composition in accordance with claim 1 in which said compound is a lower dialkyl acetal of hexoxyacetaldehyde.

18. A composition in accordance with claim 17 in which each of the alkyl groups of said dialkyl acetal has less than five carbon atoms.

19. A composition in accordance with claim 1 in which said compound is a lower alkyl hemi-acetal of hexoxyacetaldehyde.

20. A composition in accordance with claim 19 in which the alkyl group of said alkyl hemi-acetal has less than five carbon atoms.

* * * * *